United States Patent [19]

Helwig, Jr. et al.

[11] 4,163,269
[45] Jul. 31, 1979

[54] GROUND FAULT AND FIRE DETECTOR SYSTEM

[75] Inventors: William F. Helwig, Jr., Downers Grove; Henry D. Jeffries, Jr., Brookfield, both of Ill.

[73] Assignee: Avtec Industries, Inc., Downers Grove, Ill.

[21] Appl. No.: 794,356

[22] Filed: May 6, 1977

[51] Int. Cl.² ............................................. H02H 3/16
[52] U.S. Cl. ....................................... 361/42; 361/44; 361/45
[58] Field of Search ........................ 361/44, 45, 46, 42

[56] References Cited

U.S. PATENT DOCUMENTS 3,787,708  1/1974  Hobson, Jr. ............................ 361/44
3,872,355  3/1975  Klein et al. ............................. 361/45

Primary Examiner—Harry E. Moose, Jr.
Attorney, Agent, or Firm—Edward D. Gilhooly

[57] ABSTRACT

A ground fault and fire detector system for an A.C. electrical power distribution apparatus including a multi-pole circuit interrupter to disconnect a poly-phase electrical power supply from a load. A single-pole circuit device is operatively connected to the circuit interrupter for controlling its operation. Ground fault sensing circuitry is operatively positioned with respect to at least one wire for initiating a fault current. The single-pole circuit device is responsive to the fault current for activating the circuit interrupter to disconnect the power supply from the load.

10 Claims, 5 Drawing Figures

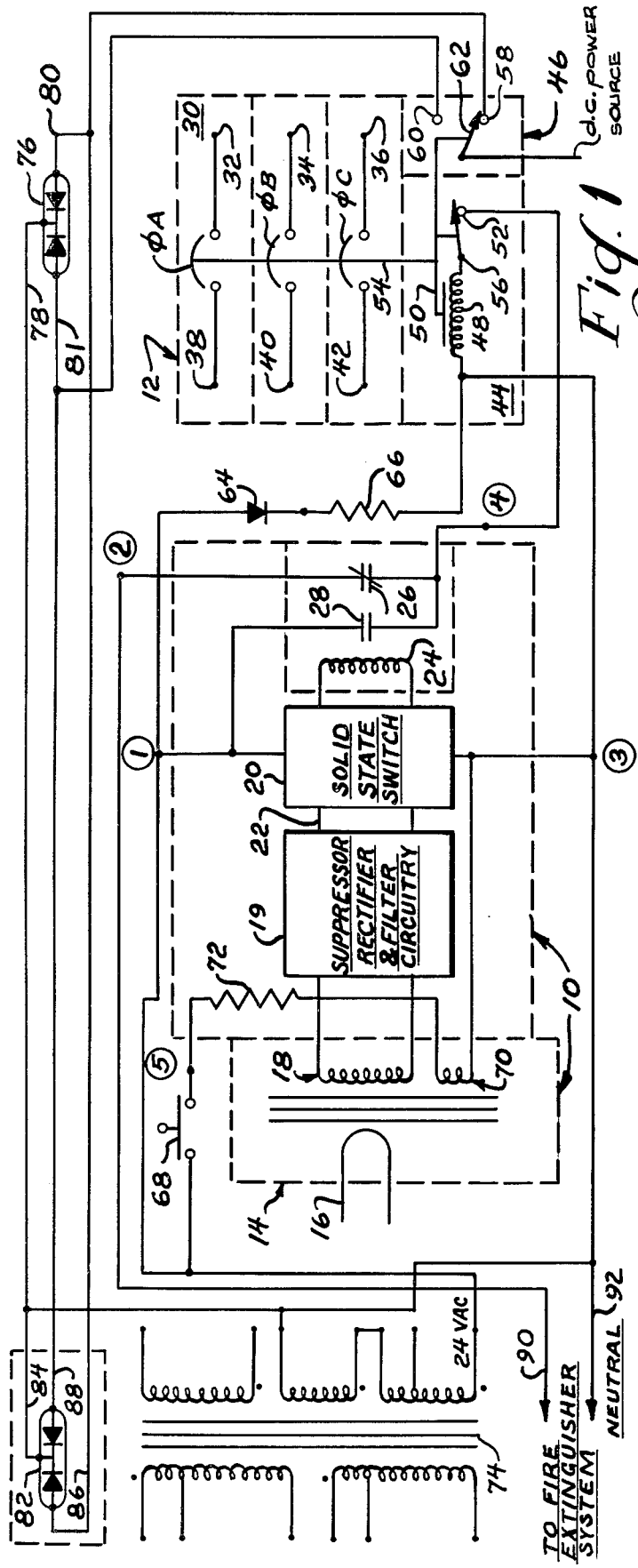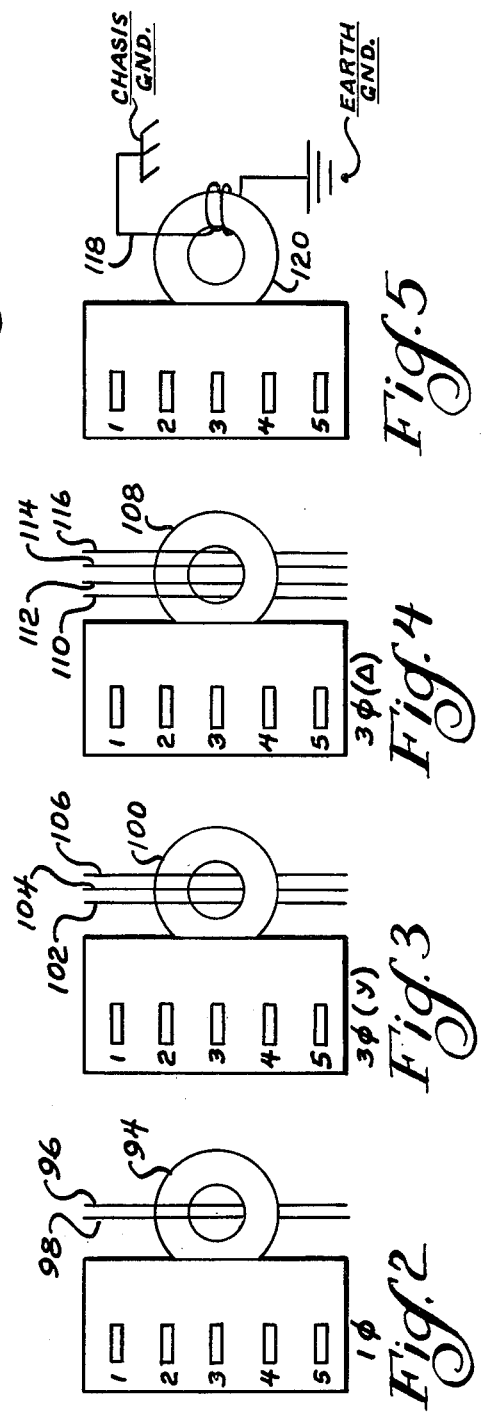

GROUND FAULT AND FIRE DETECTOR SYSTEM

BACKGROUND OF THE INVENTION

This invention relates generally to ground fault detectors and more particularly, it relates to a ground fault and fire detector system for interruption of power lines upon sensing a fault current which exceeds a pre-determined level or upon a current flow from a fire extinguisher system. The ground fault and fire detector system of this invention has particular application in industrial or commercial plants, manufacturing facilities, restaurants, kitchens, home workshops, basements, assembly lines, public buildings and virtually any other facility where a hazardous condition could arise due to a ground fault.

It is commonly known that a ground fault is defined by a failure in an electrical circuit permitting leakage current or fault current to flow therein from a hot wire to ground. Such ground faults occur for many reasons such as from worn insulation, moisture, deterioration in equipment from age or abuse and from line-to-line short-circuits in power lines.

Generally, it has been encountered that such leakage current can likewise exit between a ground on equipment and/or other electrical devices in industrial facilities, plants, and the like and the earth ground which is also a potential source of danger or hazard to operating personnel in such areas. Particularly, when a fault current occurs there is a possibility that the personnel in these areas may receive a sudden electrical shock upon touching the equipment or even become electrocuted to death upon contacting the equipment.

Another problem exists when a fire condition arises in a building or plant creating a dangerous potential whereby it is necessary to disconnect the power lines to minimize serious injury. A fire extinguisher system is typically utilized for detecting or sensing a fire and can be operatively connected to the present invention so as to cause disconnection of the power lines upon occurrence of a fire.

It would, therefore, be desirable to provide a ground fault and fire detector system which will detect or sense the presence of a ground fault current or a fire for opening up a circuit breaker to disconnect the power lines from the electrical equipment to which they are connected. It would also be advantageous to provide a ground fault detector system which has the capability of readily adjusting the sensitivity or the level of the fault current that must be exceeded before the circuit breaker will open.

SUMMARY OF THE INVENTION

Accordingly, it is an object of the present invention to provide a new and improved ground fault and fire detector system having all of the afore-mentioned features.

It is another object of the present invention to provide a ground fault and fire detector system having ground fault detection circuitry which is an integral package formed of a very few components and relatively simple in construction.

It is another object of the present invention to provide a ground fault and fire detector system which is relatively inexpensive to manufacture and has a very high reliability.

It is still another object of the present invention to provide a method and a ground fault and fire detector system which will detect or sense the presence of a ground fault current or a fire for opening up a circuit breaker to disconnect the power lines from electrical equipment.

It is still another object of the present invention to provide a ground fault and fire detector system which has the capability of adjusting simply the sensitivity or the level of the fault current that must be exceeded before a circuit breaker will open.

It is yet still another object of the present invention to provide a ground fault and fire detector system having indicator means for displaying the open/closed condition of a circuit breaker.

It is yet still another object of the present invention to provide a ground fault and fire detector system having testing means for simulating a ground fault in order to check the operation of the system.

In accordance with all of these aims and objectives, the present invention is concerned with the provision of a ground fault and fire detector system for an A.C. electrical power distribution apparatus for activating a multi-pole circuit interrupter means to disconnect an electrical power supply from a load. A single-pole circuit means is operatively connected to the interrupter means for controlling the operation thereof. Ground fault sensing means is operatively positioned with respect to at least one wire for initiating a fault current. The single-pole circuit means is responsive to the fault current for activating the interrupter means to disconnect the power supply from the load.

The ground fault detection circuitry of the present invention is formed of one integrated package housing a toroidal transformer; a test coil; supression, rectifier and filter circuitry; a solid state switch; a relay; and a pair of contacts. This enables the present system to be very small and compact in size, relatively inexpensive to manufacture, very rugged in construction, and able to withstand extremely high voltage breakdown. The circuit breaker of the present invention is highly reliable, rapid in its operation, and practically indestructable to transient currents and fires.

The present system can include indicator means for displaying the open/closed condition of the interrupter means. In addition, testing means can be incorporated in the ground fault and fire detector system for simulating a ground fault to check the operation thereof.

The instant invention is particularly efficient and economical in providing a ground fault and fire detector system for an A.C. electrical power distribution apparatus since it is formed of a very few components and can be readily assembled. Moreover, the ground fault and fire detector system of the present invention is relatively simple in construction, inexpensive to manufacture, and easy to assemble for use.

BRIEF DESCRIPTION OF THE DRAWINGS

These and other objects and advantages of the present invention will become more fully apparent from the following detailed description when read in conjunction with the accompanied drawings wherein:

FIG. 1 is an electrical schematic for a ground fault and fire detector system incorporating the presently preferred embodiment of the invention;

FIG. 2 shows a method for measuring or detecting fault current in a single-phase circuit according to the present invention;

FIG. 3 shows a method for measuring or detecting fault current in a 3-wire polyphase circuit according to the present invention;

FIG. 4 shows a method for measuring or detecting fault current in a 4-wire polyphase circuit according to the present invention; and FIG. 5 shows another method for measuring or detecting fault current, according to the present invention.

DETAILED DESCRIPTION OF THE PREFERRED EMBODIMENT

Referring now in detail to the drawings, there is shown in FIG. 1 a ground fault and fire detector system of the present invention comprising of a ground fault detection circuitry section 10 and an interrupter or circuit breaker section 12.

The ground fault detection circuitry section 10 is provided for detecting or sensing a leakage current or fault current. It includes a toroidal transformer 14 having a primary 16 and having a secondary 18 connected to a combination suppressor, rectifier, and filter circuitry 19. The secondary 18 of the toroidal transformer 14 may be suitable formed of a multi-turn coil wrapped around a core made of a type of steel known as silican ferrite. The output of the suppressor, rectifier, and filter circuitry 19 is coupled to the input of a solid-state switch 20 and provides a regulated D.C. voltage on lead line 22. A relay 24 is connected to the output of the solid-state switch 20. The relay 24 is provided with a pair of contacts 26 and 28. Contact 26 is a normally-closed contact and contact 28 is normally-opened contact.

The circuit breaker section 12 comprises 3-pole circuit breaker or interrupter 30 which is provided to connect and/or disconnect the three-phase conductors corresponding to phase A, phase B, and phase C as indicated, respectively by $\phi A$, $\phi B$, and $\phi C$, from a polyphase source of electrical power source designated by terminals 32, 34 and 36 to a three-phase balanced or unbalanced load designated by reference numerals 38, 40 and 42. The circuit breaker section 12 is also equipped with an additional pole section 44 for activating the breaker contacts, hereinafter referred to as a fire pole, and a micro-switch 46. The fire pole has a trip coil 48, a mechanical linkage 50 and a normally-closed contact 52. The mechanical linkage 50 is attached fixedly to contact arm 54 of the circuit breaker 30 and to contact arm 56 of the contact 52. The micro-swtich 46 is provided with a normally-closed contact 58 and a normally-opened contact 60. A contact arm 62 of the micro-switch 46 is also mechanically joined to the linkage 50 of the fire pole 44.

A diode 64 has its cathode connected to one end of a current-limiting resistor 66. In order to prevent possible damage to the circuitry section 10, the anode of the diode 64 and the other end of the resistor 66 are interconnected for isolation between the solid-state switch 20 of the ground fault detection circuitry section 10 and the trip coil 48 of the fire pole 44. Test circuitry consisting of a push-button switch 68, a test coil 70, and a current-limiting resistor 72 are provided in association with the toroidal transformer 14. The operation of this test circuitry will be explained in detail hereinafter. One end of the push-button switch 68 is connected to a multi-winding transformer 74 and the other end of the push-button switch is connected to one end of the current-limiting resistor 72. The other end of the resistor 72 is joined to one end of the test coil 70.

There is provided indicator means consisting of a bi-colored light-emitting diode 76 (L.E.D.) for displaying whether the contact arm 54 of the circuit breaker 30 is in the open or closed position. This diode is manufactured and sold by Dialight, an affiliate of North American Philips Company, under their trademark "Diode-lite". This bi-colored diode 76 includes a red diode and a green diode. The red and green diodes operate independently of each other and are provided with three output leads. The lead line 78 is a common connection of the cathodes of the red and green diodes. The lead line 80 is joined to the anode of the green diode which is coupled to the normally-closed contact 58 of the micro-switch 46. The lead line 81 is joined to the anode of the red diode which is tied to the normally-opened contact 60 of the micro-switch. In addition, there may be provided a remote indicating means utilizing an additional bi-colored light-emitting diode 82 having similar connections on lead lines 84, 86 and 88 as diode 76. It should be understood to those skilled in the art that other indicating means could be used such as a sound alarm and the like.

One side of the normally-opened contact 28 and one side of the normally-closed contact 26 are interconnected which is, in turn, tied to the normally-closed contact 52 of the fire pole 44. The other side of the normally-opened contact 28 is coupled to a 24 VAC power supply in the multi-winding transformer 74. The other side of the normally-closed contact 26 is sent out on lead line 90 to a fire extinguisher system (not-shown). Upon an indication of a fire, the lead line 90 will be supplied with 120 VAC. The neutral side designated by lead line 92 of the system is tied to other end of the 24 VAC power supply in the multi-winding transformer 74, to the common cathode points of the L.E.D. 76 and 82, to the other end of the test coil 70, and to the juncture of the resistor 64 and trip coil 48.

The primary 16 of the toroidal transformer 14 can be positioned as shown in FIGS. 2 through 5 for measuring or detecting a fault current. In FIG. 2, there is shown the secondary of toroidal transformer 94 having a hot wire 96 and a neutral wire 98 of a single-phase system (1 $\phi$) passing straight through the center or core of the toroidal transformer 94.

If all the current flowing back and forth on the lines 96 and 98 is balanced, the vector sum in the core of the toroidal transformer 94 is essentially zero. When there is a fault current or a leakage current, the vector sum will no longer be zero as a field will be set up in the core which is proportional to such leakage current.

Similarly, FIG. 3 showing the secondary of toroidal transformer 100 and power lines 102, 104 and 106 of a three-phase system will operate exactly as explained with respect to FIG. 2. In other words, if there is an unbalance of current flow in any two of the three wires, a field will be set up to indicate a fault current. This configuration is utilized in a three-phase system ($3\phi$) in which a power supply is connected in a wye.

If the three-phase power supply is connected in a delta formation ($\Delta$), FIG. 4 shows the secondary of a toroidal transformer 108, power lines 110, and 112 and 114, and a neutral wire 116. The operation is exactly as described with respect to FIGS. 2 and 3.

As an alternate method of passing the power lines straight through the core, a ground strap wire 118 as shown in FIG. 5 can be wrapped around the core of the toroidal transformer 120 for measuring or detecting a fault current. The ground strap 118 is interconnected between the chassis ground of the equipment and/or electrical devices in the industrial plant and the earth ground. If there is no leakage current, the earth ground and chassis ground will be at equal potential. On the other hand, upon a ground fault, leakage current will flow from the chassis ground to the earth ground thereby inducing a field in the core of the transformer 120 to indicate a ground fault.

The terminals designated 1 through 5 on FIGS. 2 through 5 correspond to the points encircled with the same reference numeral shown in FIG. 1 of the drawings. The present ground fault and fire detector system is designated and adapted for operation at current levels in the range of 15 to 100 amperes. The sensitivity of the present ground fault and fire detector system, that is, the magnitude of the ground fault required to set up a field is 0.5 amp-turns. In other words, it requires half of an amp differential current flowing between any of the two wires shown in FIGS. 2 through 4 and half of an amp current flowing in the ground strap 118 of FIG. 5 in order to generate a field sufficient or large enough to activate the ground fault detection circuitry section 10. Once the required current level is reached, the trip coil 48 will trigger the contact arm 54 to open the circuit breaker in approximately 0.5 seconds.

In order to increase the sensitivity of the system, the wires shown in FIGS. 2 through 4 can be wrapped around the core. To determine the amount of current needed to set up the required field when the wires are wrapped around the core, it is only needed to divide 0.50 amperes by the number of wrapped turns. Thus, if there is one wrap turn, only 250 milli-amperes are needed to cause an indication of a ground fault. If there are two wrap turns, only 125 milli-amperes are needed and so on.

In operation, the three poles ($\phi$A, $\phi$B, $\phi$C) of the circuit breaker 30 of FIG. 1 will normally be closed. The relay 24 and the trip coil 48 will both be de-energized. Upon the occurrence of leakage current, which induces a field set at a pre-determined value caused by the primary 16, the secondary 18 of the toroidal transformer 14 will produce current to flow into the suppressor, rectifier and filter circuit 18 so as to cause closure of the solid state switch 20. This will, in turn, energize the relay 24 so as to close the contact 28. Then, the 24 VAC from the multi-winding transformer 74 will be impressed on the trip coil 48 via the contact 52 to activate it. Due to the mechanical linkage 50 as explained earlier, energization of the trip coil 48 will open up the contacts of the circuit breaker 30, open the normally-closed contact 52 and switches the contact arm 62 from the normally-closed position to the normally-opened position. Accordingly, the green-colored light emitting diode will become extinguished and the red-colored light-emitting diode will become lit. If the remote indicating means 84 is also utilized, this will function similarly to the operation of the L.E.D. 76.

While there may not be a ground fault current present in the system, the trip coil 48 may also be triggered to open the circuit breaker upon the detection of a fire since its coil is also tied to the fire extinguisher system via lead line 90. Upon sensing a fire, the fire extinguisher system will supply 120 volts on the coil of the fire pole 44 in order to open the contacts of the circuit breaker 30.

In order to check or test the complete operation of the ground fault detector circuitry section and the circuit breaker section, the push-button switch 68 can be depressed to supply current to the test coil 70 so as to induce a field into the secondary 18 of the toroidal transformer 14 to simulate a ground fault. Upon the depression of the switch 68, the relay 24 will once again become energized so as to cause energization of the trip coil 48 thereby opening up the contacts of the circuit breaker 30.

From the foregoing description of the ground fault and fire detector system embodying the present invention, it can be seen there is provided a new and improved ground fault system wherein a single-pole circuit device is responsive to a fault current or a fire for activating the contact arm of a circuit breaker to disconnect the power supply from load. Further, there can be provided indicator means for displaying open/closed condition of the circuit breaker. Additionally, the ground fault and fire detector system of the present invention is relatively simple in construction and easy to manufacture and assemble for use.

While there has been illustrated and described what is at present to be a preferred embodiment of the present invention, it will be understood by those skilled in the art that various changes and modifications may be made and equivalents may be substituted for elements thereof without departing from the true scope of the invention. In addition, many modifications may be made to adapt to a particular situation or material to the teachings of the invention without departing from the central scope thereof. Therefore, it is intended that this invention not be limited to the particular embodiment disclosed as a best mode contemplated for carrying out this invention, but the invention will include all embodiments falling within the scope of the appended claims.

What is claimed is:

1. A ground fault and fire detector system for an A.C. electrical power distribution apparatus comprising:
    circuit interrupter means having at least one pole for disconnecting an electrical load power supply from at least one load;
    single-pole circuit means operatively connected to said interrupter means for controlling said interrupter means;
    said single-pole means being operable to disconnect a power supply from a load upon being activated by separate sources of electrical power being imposed thereon in response to detection of a ground fault or detection of fire, respectively;
    ground fault sensing means operatively positioned with respect to at least one wire for detecting a ground fault current;
    said sensing means being interposed between the single-pole circuit means and a ground fault electrical power supply of less than 120 volts to control the power from the ground fault electrical power supply to the single-pole circuit means;
    said sensing means including relay means responsive to detection of a ground fault current to electrically couple said ground fault power supply to the single-pole means for disconnecting said electrical load power supply from at least one load; and
    said single-pole circuit means being further coupled to a fire extinguish system to supply power from a fire system electrical power supply of at least 120 volts A.C. to the single-pole circuit means for activating said interrupter means upon occurrence of a fire independently of said ground fault sensing means to disconnect said electrical load power supply from at least one load.

2. A ground fault and fire detector system as claimed in claim 1, further comprising indicator means for displaying the open/closed condition of the interrupter means.

3. A ground fault and fire detector system as claimed in claim 2, further comprising switching means operatively coupled to said single-pole circuit means and said indicator means for switching between a first position and a second position upon the occurrence of the ground fault current or a fire to cause the indicator means to display the open/closed condition of the interrupter means.

4. A ground fault and fire detector system as claimed in claim 1, further comprising testing means for simulating a ground fault in order to check the operation of the system.

5. A ground fault and fire detector system as claimed in claim 1, wherein said circuit interrupter means is a circuit breaker.

6. A ground fault and fire detector system as claimed in claim 2, wherein said indication means comprises a bi-colored light-emitting diode.

7. A ground fault and fire detector system as claimed in claim 3, wherein said switching means comprises a micro-switch.

8. A ground fault and fire detector system as claimed in claim 4, wherein said testing means comprises a push-button switch, a current-limiting resistor, and a test coil.

9. The ground fault and fire detector system of claim 1 wherein the ground fault electrical power supply is 24 volts A.C.

10. The ground fault and fire detector system of claim 1 wherein the fires system electrical power supply is 120 volts A.C.

* * * * *